*E. Boughton.*
*Wheel Cultivator.*

Nº 10,467.  Patented Jan. 31, 1864.

UNITED STATES PATENT OFFICE.

ENOS BOUGHTON, OF EAST BLOOMFIELD, NEW YORK.

IMPROVEMENT IN CULTIVATORS.

Specification forming part of Letters Patent No. 10,467, dated January 31, 1854.

*To all whom it may concern:*

Be it known that I, ENOS BOUGHTON, of East Bloomfield, in the county of Ontario and State of New York, have invented a new and useful implement for the cultivation of the soil, for the extermination of thistles and other obnoxious weeds, plants, or grasses growing therein, which I call "Thistle-Digger;" and I do hereby declare that the following is a full, clear, and exact description of the construction and operation of the same, reference being had to the annexed drawings, making a part of this specification, in which—

Figure 2:
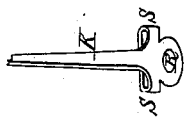
Figure 1:
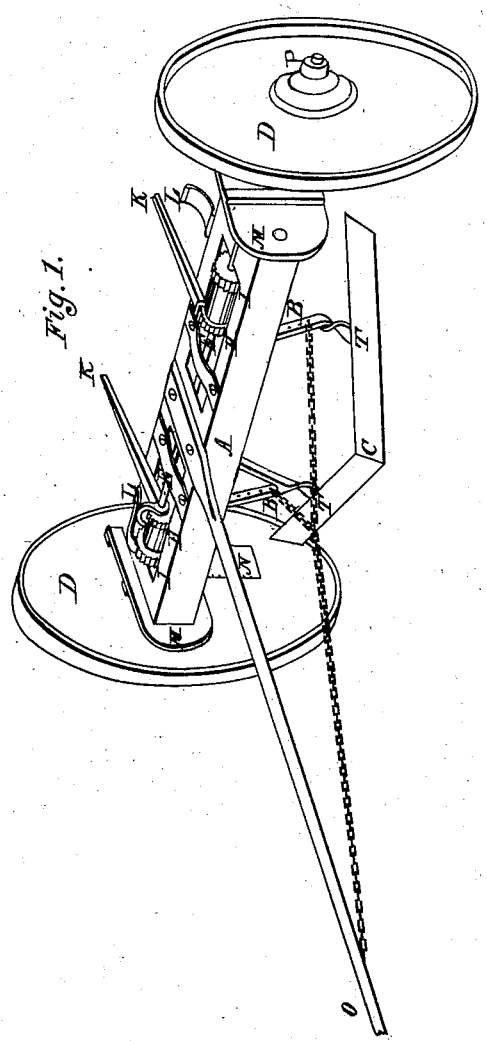

Figure 1 is a perspective view of the machine, and Fig. 2 is a side view of the lever.

The nature of my invention consists in running the knife in nearly a flat position at any required depth under ground, and thereby cutting up and loosening the soil, and also cutting off the roots of thistles, &c., growing therein, and thereby causing them to wilt and die.

To enable others skilled in the art to make and use my invention, I will proceed to describe its construction and operation.

The frame A, Fig. 1, is made in any convenient form of timber. The knife may be made of steel or any other suitable material, and should, for the sake of clearing itself from obstructions, be made pointed, as seen at C, Fig. 1.

B B are the brackets or supports for the knife C, and should be made of iron, and of any suitable form or size possessing the necessary strength. They are bolted onto the bottom of the frame A and securely fastened by bolts, rivets, or otherwise on the under side of the knife, as shown at T T.

O is the pole, which is made fast to the frame by bolts or otherwise.

The frame, with the knife attached, is raised or lowered by means of the levers K K, operating upon the ratchet-wheel H H and turning the shafts E E, on the outer end of each of which there is a small pinion, (not seen,) the the cogs of which operate upon the cogs on the front edge of the rack N, causing it to slide up and down in the slide or rack frame M M. The machine is here represented with the knife drawn up above the top of the ground.

On the outer side of the rack or slide N is an axle or arm, upon which run the wheels D D, as seen at P, to fasten the machine in any required position.

I I are two cog-wheels on the shafts E E, into the cogs of which drop the dogs L L, one of which is thrown back to give a clearer view.

The construction of the levers is shown in Fig. 2. R is an oblong hole extending crosswise of the lever. S S are two stationary dogs, one on each edge of the lever. The lever is slipped onto the shaft E E by means of the pole by the side of the ratchet-wheel H H. The dogs S S should be far enough apart so that when the shaft occupies the center of the hole in the lever neither of them will touch the wheel. Then either of the dogs may be thrown into gear by moving the lever on the shaft.

I do not claim any part of the raising and depressing device, nor do I claim the knife or the wheel separately; but What I do claim is—

The combination of the knife with the wheels, for the purpose of cutting up the ground and destroying thistles or any other obnoxious weeds, plants, or grasses growing therein.

Dated 7th October, 1850.

ENOS BOUGHTON.

Witnesses:
 ORSON BENJAMIN,
 LUTHER BARBER.